US012678999B2

(12) United States Patent
Argaman

(10) Patent No.: US 12,678,999 B2
(45) Date of Patent: Jul. 14, 2026

(54) SYSTEM AND METHOD FOR COLORING TOP SURFACE OF CLADDINGS AND CONCRETE PAVING STONES

(71) Applicant: ACKERSTEIN INDUSTRIES LTD., Herzlia (IL)

(72) Inventor: Gideon Argaman, Herzlia (IL)

(73) Assignee: ACKERSTEIN INDUSTRIES LTD., Herzlia (IL)

(*) Notice: Subject to any disclaimer, the term of this patent is extended or adjusted under 35 U.S.C. 154(b) by 289 days.

(21) Appl. No.: 17/667,743

(22) Filed: Feb. 9, 2022

(65) Prior Publication Data

US 2022/0266474 A1 Aug. 25, 2022

(30) Foreign Application Priority Data

Feb. 10, 2021 (IL) ........................................ 280802

(51) Int. Cl.
*B28B 11/00* (2006.01)
*B05B 12/00* (2018.01)
(Continued)

(52) U.S. Cl.
CPC ............ *B28B 11/048* (2013.01); *B05B 12/02* (2013.01); *B05B 13/041* (2013.01);
(Continued)

(58) Field of Classification Search
CPC ... B28B 1/0873; B28B 11/048; B28B 13/022; B28B 13/023; C04B 28/04; B05B 13/00; B05B 12/00; B05B 12/02; B05B 12/1472
See application file for complete search history.

(56) References Cited

U.S. PATENT DOCUMENTS 2,763,575 A * 9/1956 Bede ........................ B05D 1/02 118/316
3,007,438 A * 11/1961 Lancucki ................ B05B 14/00 118/710

(Continued)

FOREIGN PATENT DOCUMENTS

DE 102008050955 4/2010
DE 102016217477 3/2018

(Continued)

OTHER PUBLICATIONS

Funk, J.E., Dinger, D.R. (1994). Introduction to Predictive Process Control. In: Predictive Process Control of Crowded Particulate Suspensions. Springer, Boston, MA. https://doi.org/10.1007/978-1-4615-3118-0_1 (Year: 1994).*

(Continued)

*Primary Examiner* — JaMel M Nelson
*Assistant Examiner* — Andres E. Behrens, Jr.
(74) *Attorney, Agent, or Firm* — Fitch, Even, Tabin & Flannery LLP

(57) ABSTRACT

An apparatus for spraying fluid phase color is integrated into a cladding manufacturing machine and synchronized with the manufacturing process. The apparatus is attached to the basket through which the concrete of the claddings is poured into a mould; color spraying initiates after completing the concrete filling phase of the manufacturing of the cladding and the basket retreats to its starting point. Color guns, attached to the basket, connect to color buckets and pump and condensed air pumps to deliver sprayed fluid color onto the top surface of the claddings. A control unit controls the color spraying via a sequential, parallel or pre-selected program or set of values of parameters that determine the final design or pattern on the claddings surface.

19 Claims, 3 Drawing Sheets

(51) Int. Cl.

| | |
|---|---|
| ***B05B 12/02*** | (2006.01) |
| ***B05B 13/00*** | (2006.01) |
| ***B05B 13/04*** | (2006.01) |
| ***B05B 14/00*** | (2018.01) |
| ***B28B 1/087*** | (2006.01) |
| ***B28B 11/04*** | (2006.01) |
| *B05B 7/00* | (2006.01) |
| *B05B 7/04* | (2006.01) |
| *B05B 7/24* | (2006.01) |
| *B05B 12/04* | (2006.01) |
| *B05B 12/12* | (2006.01) |
| *B05B 12/14* | (2006.01) |
| *B05B 15/00* | (2018.01) |
| *B05B 15/20* | (2018.01) |
| *B05C 5/00* | (2006.01) |
| *B05D 5/00* | (2006.01) |
| *B05D 5/06* | (2006.01) |
| *B28B 1/00* | (2006.01) |
| *B28B 13/00* | (2006.01) |
| *B28B 13/02* | (2006.01) |
| *B28B 17/00* | (2006.01) |
| *B28B 19/00* | (2006.01) |
| *E04B 2/00* | (2006.01) |
| *E04B 2/02* | (2006.01) |
| *E04C 1/00* | (2006.01) |
| *E04F 13/00* | (2006.01) |
| *E04F 13/14* | (2006.01) |
| *E04F 15/00* | (2006.01) |
| *E04F 15/08* | (2006.01) |

(52) U.S. Cl.

CPC .............. *B28B 1/0873* (2013.01); *B05B 7/00* (2013.01); *B05B 7/0416* (2013.01); *B05B 7/2489* (2013.01); *B05B 12/00* (2013.01); *B05B 12/04* (2013.01); *B05B 12/126* (2013.01); *B05B 12/1472* (2013.01); *B05B 13/00* (2013.01); *B05B 13/0426* (2013.01); *B05B 14/00* (2018.02); *B05B 15/00* (2013.01); *B05B 15/20* (2018.02); *B05C 5/00* (2013.01); *B05D 5/00* (2013.01); *B05D 5/065* (2013.01); *B28B 1/00* (2013.01); *B28B 11/00* (2013.01); *B28B 11/001* (2013.01); *B28B 13/00* (2013.01); *B28B 13/023* (2013.01); *B28B 17/00* (2013.01); *B28B 17/0081* (2013.01); *B28B 19/00* (2013.01); *B28B 19/0053* (2013.01); *E04B 2/00* (2013.01); *E04B 2/02* (2013.01); *E04C 1/00* (2013.01); *E04F 13/00* (2013.01); *E04F 13/14* (2013.01); *E04F 15/00* (2013.01); *E04F 15/08* (2013.01)

(56) References Cited

U.S. PATENT DOCUMENTS

| | | | | |
|---|---|---|---|---|
| 3,216,464 A * | 11/1965 | Horst | H01Q 17/00 | 198/525 |
| 3,499,069 A * | 3/1970 | Seigle | B28B 3/02 | 264/234 |
| 4,032,073 A * | 6/1977 | Aaltonen | B05B 13/06 | 239/340 |
| 4,089,509 A * | 5/1978 | Morton | E01C 19/1072 | 366/8 |
| 4,178,340 A * | 12/1979 | Hyytinen | B28B 11/06 | 52/311.1 |
| 4,975,303 A * | 12/1990 | McKinnon | C04B 28/04 | 427/268 |
| 5,183,616 A * | 2/1993 | Hedrick | B28B 11/04 | 249/176 |
| 5,993,551 A * | 11/1999 | Hahn | B05B 13/0278 | 118/314 |
| 6,461,552 B1 | 10/2002 | Geiger | | |
| 8,800,245 B1 | 8/2014 | Pien | | |
| 2003/0198122 A1* | 10/2003 | Johnson | B28B 13/022 | 106/712 |
| 2004/0121082 A1* | 6/2004 | Dunnous | C04B 41/483 | 427/256 |
| 2005/0144897 A1* | 7/2005 | Breedlove | B28B 13/023 | 52/745.19 |
| 2006/0204667 A1 | 9/2006 | Kreutzer | | |
| 2006/0237088 A1* | 10/2006 | Morey | B28B 1/005 | 425/207 |
| 2006/0260255 A1 | 11/2006 | Ganpule | | |
| 2010/0239816 A1 | 9/2010 | Kinkade | | |
| 2014/0138876 A1* | 5/2014 | Foppe | B28B 13/022 | 264/299 |
| 2014/0147544 A1* | 5/2014 | Foppe | B65D 81/2053 | 425/447 |
| 2015/0290836 A1* | 10/2015 | Foppe | B28B 1/04 | 425/454 |
| 2017/0021529 A1* | 1/2017 | Cunningham | B28C 7/044 | |
| 2017/0036228 A1* | 2/2017 | Thurow | A01M 7/0042 | |
| 2019/0255734 A1* | 8/2019 | Pegg | B28B 7/10 | |
| 2019/0338533 A1 | 11/2019 | Palladino | | |
| 2021/0276221 A1* | 9/2021 | Bosi | B44F 9/04 | |
| 2022/0063130 A1* | 3/2022 | Argaman | B28B 23/0075 | |

FOREIGN PATENT DOCUMENTS

| | | | |
|---|---|---|---|
| EP | 1203649 B1 | | 3/2005 |
| EP | 3166904 | | 5/2017 |
| EP | 3630433 | | 4/2020 |
| ES | 2757976 | | 4/2020 |
| JP | H0919915 A | | 1/1997 |
| JP | 2005001174 | | 1/2005 |
| JP | 2005001174 A | * | 1/2005 |
| WO | WO-2001062398 A1 | * | 8/2001 |
| WO | 2016005566 | | 1/2016 |
| WO | 2018219525 | | 12/2018 |
| WO | 2019070621 A2 | | 4/2019 |

OTHER PUBLICATIONS https://www.azom.com/article.aspx?ArticleID=13727 (Year: 2017).*

JP-2005001174-A (Ido) May 2005 (online machine translation), [Retrieved on Apr. 30, 2024]. Retrieved from: Espacenet (Year: 2005).*

WO-2001062398 (Slowik) Aug. 2001 (online machine translation), [Retrieved on Apr. 30, 2024]. Retrieved from: Espacenet (Year: 2001).*

European Search Report, European Patent Application No. 22155489, dated Jun. 22, 2022, 2 pages.

Israeli Search Report, Israeli Patent Application No. 280802, dated Jun. 3, 2021, 2 pages.

European Patent Office, Communication Under Rule 71(3) EPC issued in European Patent Application No. 22155489, Oct. 22, 2024, 27 pp.

European Patent Office, Decision to Grant a European Patent pursuant to Article 97(1) EPC issued in European Patent Application No. 22155489, Mar. 6, 2025, 3 pp.

Letter from Dr. Tobias Hoheisel, Cohausz & Florack, dated Dec. 16, 2025, regarding European Patent EP 4043169 B1 to Ackerstein Industries Ltd, 6 pages.

* cited by examiner

SYSTEM AND METHOD FOR COLORING TOP SURFACE OF CLADDINGS AND CONCRETE PAVING STONES

TECHNICAL FIELD

The present invention pertains to a system and a method for integrated coloring pavement and tiles claddings for paving floors and covering walls. More particularly, the present invention pertains to an apparatus for coloring the upper surface of claddings and tiles inside a machine and in an ongoing process of manufacturing for manufacturing such claddings and tiles, made of concrete.

BACKGROUND

Current cladding manufacturing machines are designed to produce two layer pavements and tiles. A standard manufacturing system comprises two separate containers that contain the compositions of the base and upper layers, a production board, a vibration table and a mould that receives the compositions to form the shape of the pavement or tile. One configuration of a current manufacturing machine 200 is schematically illustrated in FIG. 1. Every one of the major containers 205 also carries a basket at its bottom 235 for letting out the composition it contains in a controlled manner. In the particular configuration in FIG. 1, the two containers are positioned above the production plate in opposing relative positions, and the basket travels back and forth above the mould for releasing their respective compositions. At the center of the machine stands is a vibration work table, which is designed to condense the concrete inside the mould. Above the vibration table stands a "production board", which can be made of wood, synthetic material or metal. The mould lowers onto the board with a desired pattern of a tile or brick, where the shape of the tile, brick or cladding is obtained by partitions within the mould which is hollow. Above the mould stands a "tamper head" with plates in the size of the tiles, bricks or claddings in proper position relative to the mould. In common technology, flooring and tiling products are manufactured with automatic machines that produce one or two layer concrete pavements and tiles, where the second upper layer is visible and made from a slightly different composition than the first base layer. The first base layer imparts the pavement/tile its strength and is embedded in the infrastructure or body of a pavement or wall. The second layer is the upper layer that contains aggregates and sometimes pigments if required and gives the pavement and tile their decorative look.

Custom coloring of pavement/tile cladding is done by mixing colorants in the manufacturing system. One or more selected pigments are mixed into a concrete mixture in known amounts to obtain a desired color, hue and color intensity. The way of mixing the pigments in the concrete batch determines the color pattern. The pigment particles cover the particles of the concrete cement, thus providing the concrete its color. The concrete is then cast onto a mould and becoming dense by vibration. Such coloring methods require relatively large amounts of colorant materials to make the cladding color visible at the top of the claddings. In addition, mixing the colorants into the bulk of the claddings significantly limits the variety of color hues and patterns that can be obtained at their top surface.

It is, therefore, desirable to provide claddings with a greater variety of color patterns which are visible at least on the claddings surface and independent of the coloring of the bulk of the claddings.

Respectively, it is an object of the present invention to provide a system, devices and methods for coloring the top surface of claddings in any desirable hues, shades, intensity and pattern, independently of the coloring or non-coloring of the claddings bulk, or using the basic color of the concrete as a background for the final look.

Further, it is an object of the present invention to provide an integrated system for manufacturing claddings and coloring their top surface, thus exploiting the advantages of the cladding manufacturing and coloring devices to obtain strong adherence of color to the top surface. The color applied on the fresh concrete poured to the mould in the middle of the manufacturing process creates the bond needed between color applied and the concrete.

This and other objects and embodiments of the present invention shall become apparent as the description proceeds.

SUMMARY

In one aspect, the invention pertains to a system and a method for integrated coloring pavement and tiles claddings for paving floors and covering walls. The invention also pertains to colored pavement and tile claddings, which are made in such method and system. Custom coloring of pavement/tile cladding is done by mixing colorants in the manufacturing system. One or more selected pigments are mixed into a concrete mixture in known amounts to obtain a desired color, hue and color intensity. The way of mixing the pigments in the concrete batch determines the color pattern. The pigment particles cover the particles of the cement, thus providing the concrete its color. The concrete is then cast onto a mould and becoming dense by vibration, while the mould head 215 is pressed down on the mould. Such coloring, however, provides only a limited control on the visible pattern of the color on the top surface of the claddings, and therefore, raises the need to enlarge the variety of possible visible color patterns.

Current manufacturing machines are designed to produce only two layer pavements and tiles. A standard manufacturing system comprises two separate containers that contain the compositions of the base and upper layers, a production board, a vibration table and a mould that receives the compositions to form the shape of the pavement or tile. One configuration of a current manufacturing machine is schematically illustrated in FIG. 1. Every one of the major containers also carries a basket 235 at its bottom for letting out the composition it contains in a controlled manner. In this particular configuration, the two containers are positioned above the production plate in opposing relative positions, and the baskets travel back and forth above the mould for releasing their respective compositions. In common technology, flooring and tiling products are manufactured with automatic machines that produce one or two layer concrete pavements and tiles, where the second upper layer is visible and made from a slightly different composition than the first base layer. The first base layer imparts the pavement/tile its strength and is embedded in the infrastructure or body of a pavement or wall. The second layer is the upper layer that contains aggregates and sometimes pigments if required and gives the pavement and tile their decorative look. A coloring device or system is, therefore, needed to independently control the visible color pattern on the top surface of the second upper layer but be integrated into the process of manufacturing the claddings, without interfering with the cycle-time and production efficiency.

To achieve this, the present invention provides a color spraying apparatus and integrates it into a cladding manufacturing machine, for example the machine illustrated in FIG. 1. Color spraying is done during forward and backward movement of the basket of the concrete upper layer. First, the upper basket moves forwards and discharges the concrete of the top layer. In returning back to the starting point, color guns of the color spraying apparatus spray color onto the upper surface of the fresh top layer according to a selected program that a control system commands to obtain a certain color, hue and color pattern and intensity. A tamper head lowers down on the fresh claddings to cover and press the upper layer in the mould after color spraying is done. As the cladding manufacturing machine vibrates the table, on which the claddings mould sits to make the concrete denser, the sprayed color is mixed with the upper surface of the concrete to a limited depth into the top layer and enables the pigment particles to bond to the surface of the particles of the concrete cement. The insertion of the pigment particles is done in the first few millimetres of the top layer of the cladding. Thus, the coloring of the top surface of the top layer may be done with or without the coloring of the entire layer. The sprayed color is a water diluted pigment similar to the concrete particle, so it creates an integrated bonding of the pigment, which creates long lasting color on top of stones.

In one particular embodiment, the pigments, which are usually used to color the concrete, are oxidants of natural minerals, for example magnetite and hematite (iron oxides) for black and red colors, respectively.

Particle size of the magnetite and hematite is one order of magnitude less than the size of cement particles of the cladding, namely a ratio of 1:10. This is particularly relevant for adherence of the pigment particles to the cladding cement particles in the top layer of the cladding to ensure strong adherence of the color to the cement. Particularly when the concrete is still wet and the production board is vibrated, the pigment particles are better embedded in the top layer of the surface. This ensures lasting color covering of the surface of the cladding.

In accordance with the above, the present invention provides a color spraying apparatus for coloring the upper surface of claddings, where the apparatus comprises the following parts:

1) Color guns attached to a basket that discharges the concrete of the upper layer of the claddings.
2) Color pumps for pumping fluid phase color mass to the guns.
3) Air pressure controlled and regulated valves for spraying the color mass off of the color guns.
4) Color containers that contain the fluid phase color masses.
5) Mixers inside the color containers for mixing the color mass and keeping its suspension homogenous. In particular, such mixers may be mechanical mixers, electric mixers, pneumatic mixers and magnetic stirrers.
6) Color pumps for pumping the color mass from each container to the color guns.
7) Back pipes for returning color mass from the guns to the containers, for example color residues or over flown amount of mass, and for creating a continuous homogenization of the color mix.
8) A control system, i.e., control operating unit, that controls and synchronizes the speed of the basket for the upper layer, activation, initiation and termination of color spray for every color gun, and timing of color spraying and coordinating with forward and backward movement of the basket of the concrete of the upper layer. Further, in one embodiment, the control operation unit is a controller or a computer processing unit interfacing a machine control.

It is understood that the term "fluid phase color mass" comprises all forms of color pigments, dyes and colorants containing fluids that may be conveyed by spraying. In particular, this term comprises all forms of color pigments, dyes and colorants containing fluids that may be conveyed by the color spraying apparatus of the integrated machine of the invention. For example, such fluids may be suspensions, emulsions or solutions of color pigments, dyes and colorants that are conveyable as spray, particularly by the color spraying apparatus of the present invention. The color solutions are designed to integrate with the concrete cement to allow long lasting color.

In still another aspect, the present invention provides an integrated system for manufacturing and coloring claddings. In still another embodiment, such system comprises a color spraying machine as detailed above and illustrated in the drawings and described in the following description and a cladding manufacturing machine as illustrated in FIG. 1. An additional advantage of the integrated system of the present invention for coloring top surfaces of claddings is that it does not require additional post-production processes, but rather completes the manufacturing and top surface integrated coloring of the cladding.

In view of the above, the present invention provides an integrated machine for manufacturing claddings and coloring the top surface of the claddings, where the integrated machine comprises:

a cladding manufacturing machine comprising:

at least one basket, funnel and hopper for filling, delivering and pouring "dry" concrete, said at least one basket, funnel and hopper are movable along a selected path;

a mould for receiving the concrete from said at least one basket;

a vibrating table;

a vibrator below the vibrating table and in mechanical contact with the vibrating table;

a production board that carries the mould on it and that lays on the vibrating table and in friction contact with the vibrating table for vibrating the production board and mould and the concrete in the mould;

and a tamper head for pressing defined cladding units of the concrete in the mould;

and a color spraying apparatus comprising:

color spraying guns attached to the at least one basket for spraying fluid phase color mass on top surface of an upper layer of the claddings; and means for containing, mixing, and spraying the fluid phase color mass and delivering the fluid phase color mass to the color spraying guns.

Generally, the concrete claddings mostly contain two layers of "wet" and "dry" concrete, which are layered in serial manner. The "wet" concrete forms the front side of the cladding blocks/elements, and the "dry" concrete forms the back side of the element. The machine fills a pre-selected pattern with the "wet" and then "dry" concrete according to the dimensions of the pattern. Then it presses the concrete layers with a hard-press. By "dry" concrete is meant a relatively low amount of liquids in the concrete that enables faster drying. "Wet" concrete means a relatively higher amount of liquids in the concrete that dries in a relatively longer period of time.

In still another aspect, the present invention provides a top surface colored multi-layer or single-layer cladding, paving stones, concrete pavers, concrete stones and concrete claddings. In the following, the term "cladding" will be used as a generic name for all the types of products which may be manufactured by the system and method of the present invention and as listed above.

In what follows and in accordance with the previous paragraphs, a detailed description of preferred non-limiting embodiments of the invention is disclosed for the product, method, machinery and elements for manufacturing the top surface colored claddings without departing from the scope and spirit of the invention.

DETAILED DESCRIPTION OF THE DRAWINGS

Figure 1:
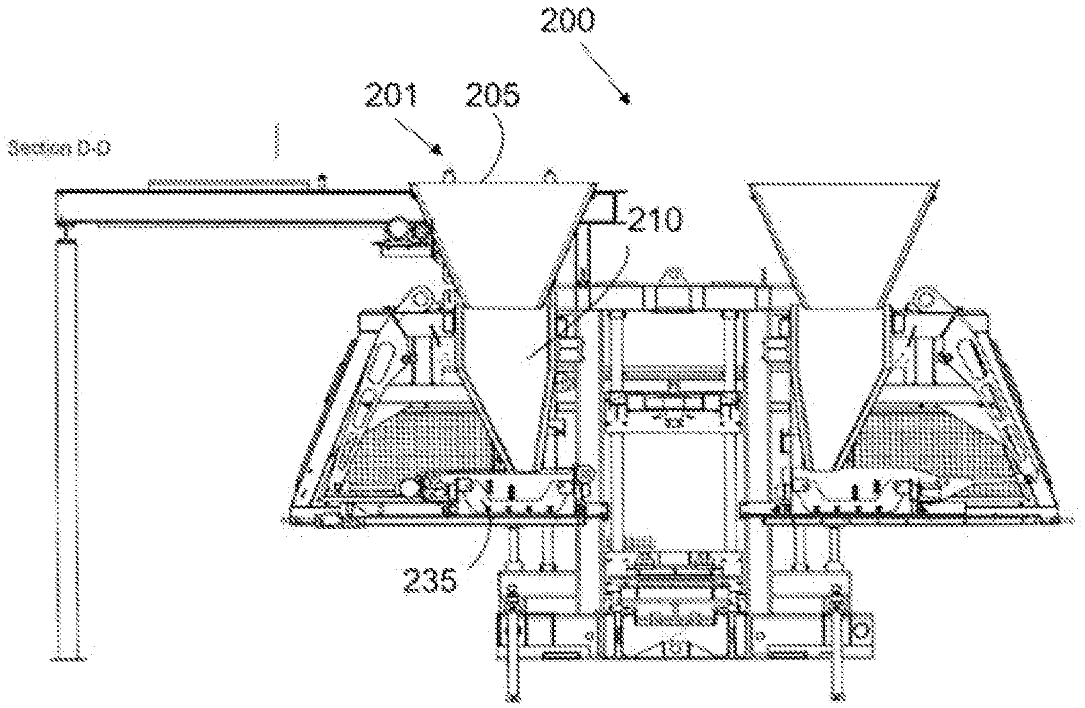
FIG. 1 schematically illustrates a type of a cladding manufacturing machine into which an apparatus for coloring the top surface of the claddings upper layer may be integrated.
Figure 2:
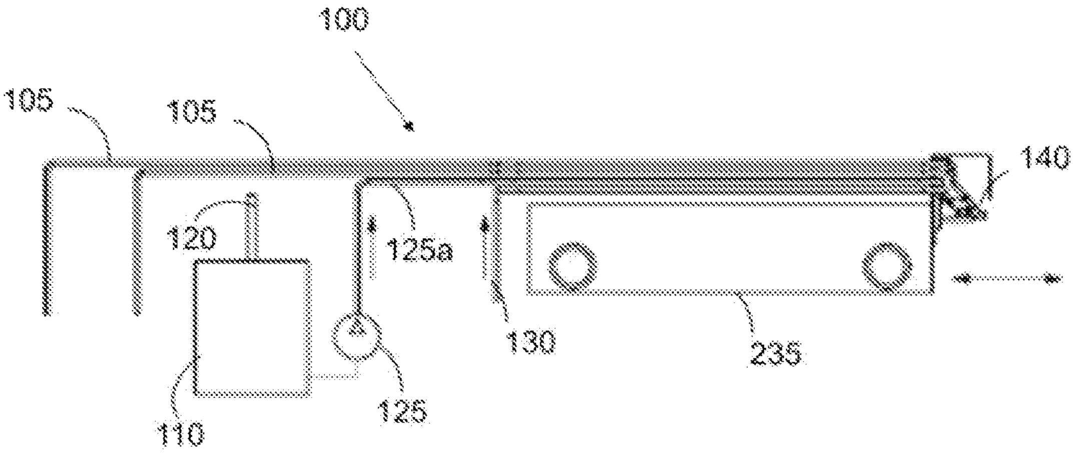
FIG. 2 schematically illustrates a color spraying apparatus for coloring the top surface of claddings, which are manufactured in a cladding manufacturing machine.
Figure 3:
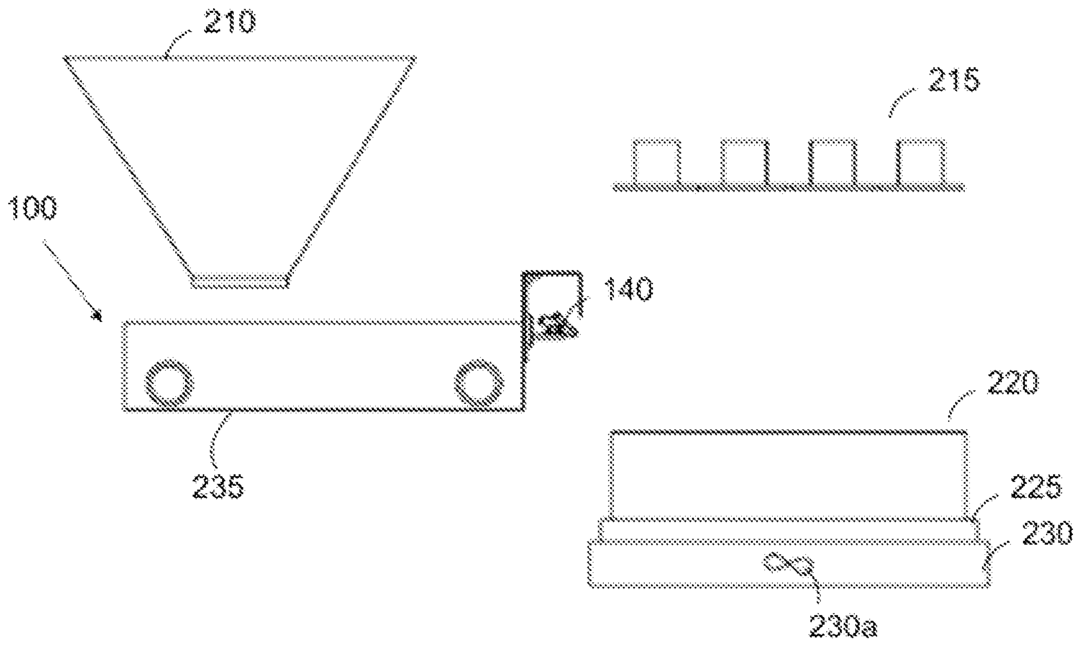
FIG. 3 schematically illustrates the color spraying apparatus for coloring the top surface of the claddings, which is integrated into the cladding manufacturing machine in pre-operation state and before overlaying the upper layer.

As mentioned above, FIG. 1 illustrates a cladding manufacturing machine 200 that comprises bottom and top layer concrete containers 201, each comprising a hopper 205 a funnel 210 and a basket 235. The upper hoppers 205 are filled with the concrete for the corresponding upper and lower layers of the claddings. A gate between the basket and funnel 210 opens and discharges a prescribed quota to the basket 235 for filling the cladding mould (see element 220 in FIG. 3) with the base/bottom or upper layer concrete. The cladding mould 220 is placed on a production board 225, which is placed on a vibrating table (see element 230 in FIG. 3), and the concrete is discharged from the basket 235 into the mould. The basket 235 returns to its initial place for another cycle for refilling and discharging. Then the gate opens between the funnel 210 and basket 235 of the concrete for pouring the upper or top layer concrete for the upper layer. After the top layer concrete basket 235 is filled with a selected quota, it travels to a point above the mould 220 and discharges the concrete into the mould. It then travels back for the next cycle. A vibrator 230*a* in the vibrating table (see element 230 in FIG. 3), vibrates the work table to condense the concrete of the base and top layer after filling the mould with the concrete of any of these layers. A tamper head (see element 215 in FIG. 3) lowers down on the mould and closes it. The mould moves up and returns to the work table, leaving the concrete claddings on the board that is moved by a conveyor and handling system to the curing chambers. A color spraying apparatus 100 is introduced into the cladding manufacturing machine 200 and attached to the basket of the top layer of the claddings as schematically illustrated in FIG. 3. An example of a spray coloring apparatus is schematically illustrated in FIG. 2. Such apparatus 100 comprises color spraying guns 140 attached to the basket 235 that discharges the concrete of the upper layer of the claddings; color pumps 125 for pumping fluid phase color mass to the guns; a pipe 125*a* for channelling the fluid color to the guns; color buckets 110 for containing the fluid phase color masses; compressed air pump and pipe 130 that connects to the color guns for generating color spray; and air pressure controlled and regulated valves for spraying the color mass off of the color spraying guns. Auxiliary compressed air pumps and pipes 105 may be provided for further controlling the intensity and color droplet size, which are shot from the color spraying guns. A part of the coloring system is connected to the basket and moves with it, namely the spray guns, valves, intermediate pressure vessels for color and air, and electric connectors and cables. All the rest stays by the machine and connected with hoses and electric cables. The vibrator and vibrating table of the cladding manufacturing machine are further used to vibrate the concrete mass in the mould and embed the pigment particles of the color mass in the upper layer of the concrete. The size ratio of the pigment particles and particles of the cement is 1:10, so that upon vibration the pigment particles adhere to the cement particles inside the upper layer of the concrete and provide a lasting coloring of the top surface of the cladding.

The color spraying apparatus may further comprise a mixer 120 for mixing the color in the buckets 110 to maintain a homogeneous fluid phase color. Further, the color spraying apparatus may also comprise back pipes for returning color mass from the guns to the containers, for example color residues or over flown amount of mass and for creating a continuous homogenization of the color mix. The mixer 120 may be any type of mixer for mixing fluids, e.g. mechanical mixer, electric mixer, pneumatic mixer and magnetic mixer.

The spraying of color may wish to achieve a selected design or pattern on the top surface of the upper layer of the claddings. Therefore, the color spraying apparatus may further comprise a control system, i.e., control operating unit, that controls and synchronizes the speed of the basket for the upper layer, activation, initiation and termination of color spray for every color spraying gun, timing of color spraying and coordinating with forward and backward movement of the basket of the concrete of the upper layer and color droplet size, which is controlled by the air pumps. The control operation unit may be a controller or a computer processing unit interfacing a machine control.

Figure 4:
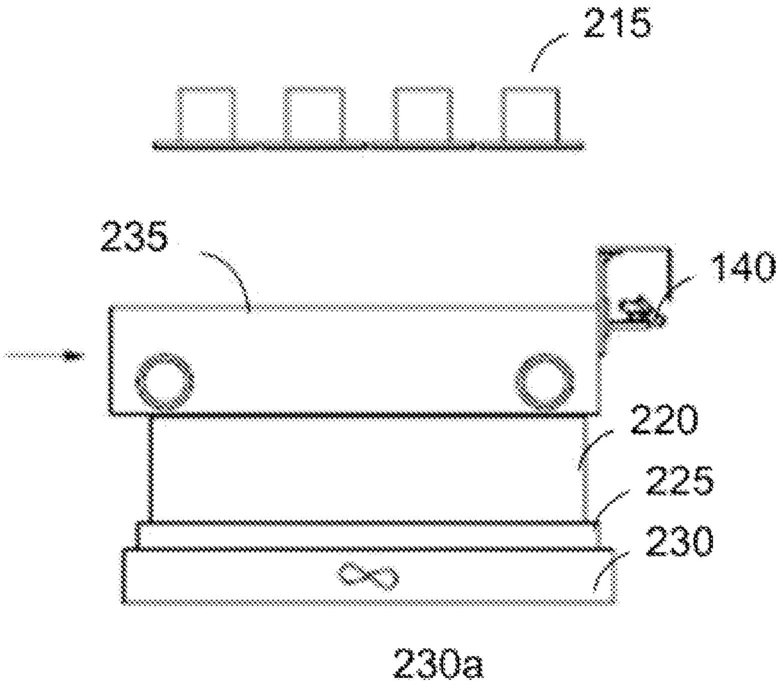
FIG. 4 schematically illustrates the color spraying apparatus for coloring the top surface of the claddings in pre-operation position.
Figure 5:
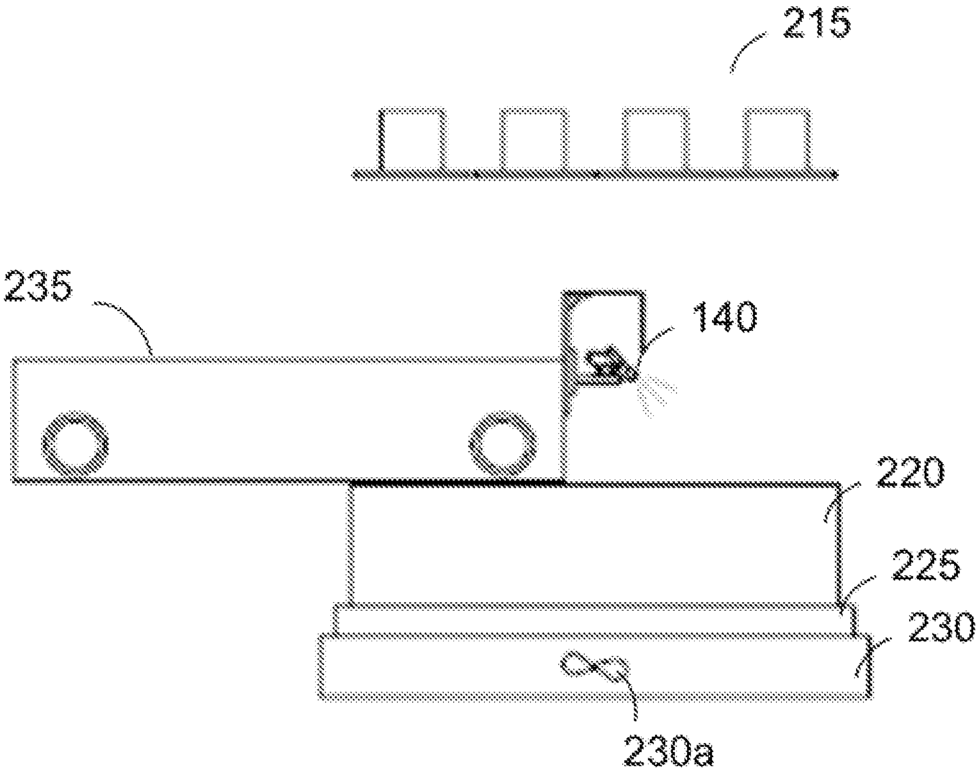
FIG. 5 schematically illustrates the color spraying apparatus for coloring the top surface of the claddings in operation.

FIGS. 3 through 6 schematically illustrate the major steps of spraying color on the top surface of claddings in an integrated machine that comprises the cladding manufacturing machine and color spraying apparatus. In FIG. 3, the hopper 205 of the upper layer of the claddings pours a prescribed quota of concrete into the basket 235 through the funnel 210. The basket then travels until positioned over the mould 220 and pours the concrete as FIG. 4 shows. In this step, the color spraying apparatus including the color guns are inactive. Upon retreating of the basket 235 to its initial, starting position, the color spraying apparatus initiates a color spraying session on the top surface of the upper layer of the claddings. In both steps, the tamper head 215 that presses the concrete in the mould into defined claddings is lifted off of the mould to enable the pouring of the concrete and the spraying of color. FIG. 5 schematically illustrates the color spraying over the concrete in the mould 220 with the color spraying guns 140 as the basket 235 travels back and exposes the top surface of the concrete in the mould. In this step, the color pumps 125 pump a quota of fluid phase mass of color from the color bucket 110 and stream it through color channels 125*a*. Simultaneously with the pumping of color to the color spraying guns, compressed air is driven with an air pump through pipe 130. The fluid phase color and condensed air meet at the outlet of the color spraying guns, where the exits ends of their corresponding pipes, 125*a* and 130, coincide. As a result, the condensed air introduces into the fluid phase color at high velocity and breaks the continuous fluid phase into small droplets. Air pressure controlled and regulated valves for spraying the color mass off of the color spraying guns enable shooting the droplets down on the top surface of the claddings. Thus the simultaneous release of fluid phase color and air in high velocity breaks the color fluid mass and generates a spraying effect of the color.

To further control the spraying of the color, particularly the size of the color droplets and intensity of spraying, auxiliary compressed air pumps and pipes 105 attach to color spraying guns and stream supplemental condensed air to the guns outlet. This further reduces the size of the fluid color droplets and increases the velocity of color spraying. The additional supplemental condensed air provides further control on the spraying process and droplet size, thus drawing finer patterns and designs on the top surface of the claddings.

After the color spraying is completed, the tamper head moves down on the mould and the vibrator 230*a* vibrates the vibrating table 230 that vibrates the production table 225 of the cladding manufacturing machine to condense the concrete in the mould 220. Such vibration causes the solid particles of the sprayed color to penetrate into the top layer of the claddings. The penetration of the color particles depends on different parameters such as the intensity of vibration and density of the concrete of the top layer, but usually shallow level penetration of about a few millimetres is sufficient for strong adherence of the color particles to the particles of the cement. Such improved adherence makes the colors and patterns on the top surface of the claddings more resistant to destructive processes such as abrasion, wear, erosion, UV radiation and washing with aqueous and non-aqueous fluids. At the same time, the colors and patterns remain visible with lively long term appearance and a complete pattern.

Figure 6:
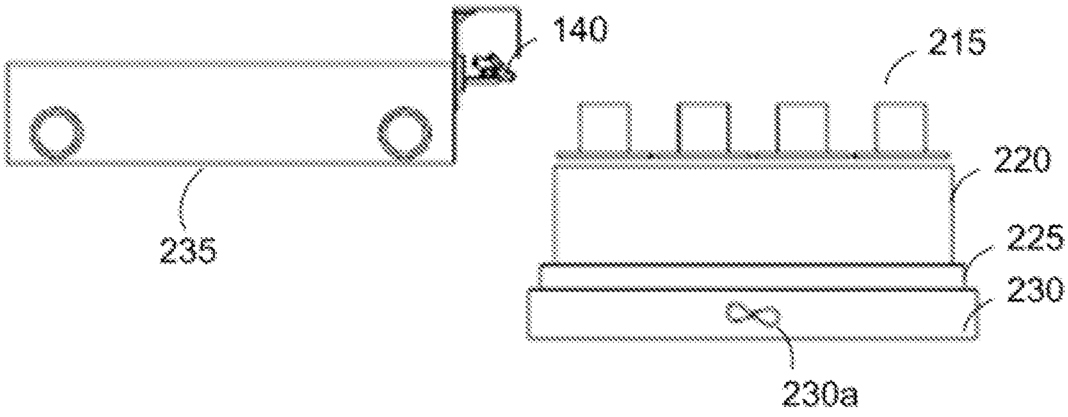
FIG. 6 schematically illustrates the color spraying apparatus for coloring the top surface of the claddings after completion of operation.

The manufacturing of the colored claddings is completed with the tamper head 215 lowered down on the mould 220, pressing the claddings in the mould. FIG. 6 illustrates this last step as the tamper head 215 is down and the basket 235 of the top layer retreats to its starting position together with the color spraying guns 140. In this step the guns 140 are shut and remain inactive until the hopper of the top layer completes starts retreating to its starting point after pouring the concrete it contains into the mould.

The color spraying cycle may be controlled and monitored by a control operation unit, which may be a controller or a computer processing unit. Such control unit may be configured to control and monitor any one of the following operations simultaneously, sequentially or according to any pre-determined or pre-selected program: synchronize the spraying of colors with the travelling back of the basket 235 of the top layer; select the colors and color mix to be sprayed according to a selected pattern or design; control the timing of spraying by the color spraying guns of each of the selected colors and color mixes; control the pressure and number of air pumps active in the formation of the color spray, thus control the intensity and spread of the color on the top surface of the upper layer of the claddings; stir the mixer in the color bucket constantly or in any selected time intervals to maintain the fluid phase color mass homogeneous and the suspension stable without precipitates formed at the bottom of the bucket; and synchronize the color spraying with the operation schedule of the cladding manufacturing machine, particularly the initiation and retreat times of the basket of the upper layer of the claddings and its speed.

Accordingly, a user may program the control operation unit to select any particular preset program for color spraying the top surface of the claddings to obtain any design or pattern. Alternatively, the user may set the values of any one of the parameters that determine the operation of the color spraying apparatus, which is integrated in the cladding manufacturing machine to obtain any desired pattern or design on the top surface of the upper layer. These parameters may be defined according to the functions that the color spraying apparatus is configured to do and the control operation unit is configured to control.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. An integrated machine for manufacturing claddings and integrated coloring top surface of said claddings, said integrated machine comprising:

a cladding manufacturing machine comprising:

at least one basket, funnel and hopper for filling, delivering and pouring dry concrete, said at least one basket is movable along a selected path;

a mould for receiving said concrete from said at least one basket;

a vibrating table;

a vibrator below said vibrating table and in mechanical contact with said vibrating table;

a production board that carries said mould on it and that lays on said vibrating table and in friction contact with said vibrating table for vibrating said production board and mould and said concrete in said mould; and a tamper head for pressing defined cladding units of said concrete in said mould; and a color spraying apparatus comprising:

color spraying guns attached to said at least one basket for spraying fluid phase color mass on top surface of an upper layer of said claddings;

a container for holding said fluid phase color mass;

a mixer for mixing said fluid phase color mass;

at least one pipe fluidly connecting said container with said color spraying guns; and a pump for moving said phase color mass through said at least one pipe, wherein said spraying guns are inclined at an angle greater than zero relative to an axis perpendicular to said top surface of said claddings, wherein air pressure is controlled and regulated by valves for spraying said color mass off of said spraying guns, said air pressure meeting the fluid phase color mass at the spraying guns to break the fluid phase mass into droplets, wherein said vibrator vibrates said vibrating table at an intensity to embed the droplets of said fluid phase color mass inside said top surface of said claddings.

2. The integrated machine according to claim 1, wherein said pump comprises compressed air pump and pipe that connects to said color spraying guns for generating color spray, and air pressure controlled and regulated valves for spraying said color mass off of said color spraying guns.

3. The integrated machine according to claim 1, wherein said pump comprises auxiliary compressed air pumps and pipes for introducing compressed air to break the fluid phase mass into droplets and increase a velocity of the droplets sprayed from the spray guns.

4. The integrated machine according to claim 1, wherein said container comprises at least one bucket for containing color, wherein said mixer is inside said at least one bucket.

5. The integrated machine according to claim 4, wherein said mixer is a mechanical mixer.

6. The integrated machine according to claim 4, wherein said mixer is a magnetic stirrer, electric mixer, pneumatic mixer, or mechanical mixer.

7. The integrated machine according to claim 1, further comprising back pipes for returning color residues or over flown amount of said fluid phase color mass from said color spraying guns to containers and for creating a continuous homogenization of the fluid phase color mass.

8. The integrated machine according to claim 1, further comprising a computer processing unit for controlling and synchronizing speed of said at least one basket of said upper layer with color spraying by said color spraying guns, activating, initiating and terminating color spraying for every color spraying gun, and timing color spraying and coordinating with forward and backward movement of said at least one basket of said upper layer.

9. The integrated machine according to claim 8, wherein said computer processing unit interfaces a machine control.

10. The integrated machine according to claim 8, wherein said computer processing unit is configured to simultaneously, sequentially or according to any pre-determined or pre-selected program control and monitor actions as follows: synchronize spraying of colors on top surface of said upper layer with travelling back of said at least one basket; select colors and color mix to be sprayed according to a selected pattern or design;

control timing of spraying by said color spraying guns of each of selected colors and color mixes; control pressure and number of air pumps active in formation of a color spray; control intensity and spread of said colors and color mixes on top surface of said upper layer of said claddings; stir a mixer in at least one bucket of said colors constantly or in any selected time intervals to maintain said fluid phase color mass homogeneous and a suspension of said colors stable without precipitates formed at bottom of said at least one bucket; and synchronize said color spraying with operation schedule of said cladding manufacturing machine.

11. The integrated machine according to claim 10, wherein said computer processing unit is further configured to synchronize initiation and retreat times and speed of said at least one basket of said upper layer of said claddings with said color spraying.

12. The integrated machine according to claim 1, wherein said color spraying apparatus is configured to spray fluid phase color mass selected from suspensions, emulsions and solutions comprising color pigments, dyes or colorants, wherein particle size ratio between particles of said color pigments, dyes and colorants and particles of cement of said cladding is one order of magnitude in favor of said particles of cement.

13. The integrated machine according to claim 12, wherein said color pigments, dyes and colorants are selected from oxidants of natural minerals.

14. The integrated machine according to claim 13, wherein said natural minerals are selected from magnetite and hematite (iron oxides) for black and red colors, respectively.

15. The integrated machine according to claim 14, wherein said particle size of said magnetite and hematite is one order of magnitude less than cement particle size of said cladding.

16. The integrated machine according to claim 1, wherein said vibrator vibrates said vibrating table at the intensity to cause embedded color particles of said fluid phase color mass to penetrate below said top surface of said claddings.

17. The integrated machine according to claim 1, wherein said vibrator vibrates said vibrating table at the intensity to facilitate strong adherence of said color particles to particles of said concrete of said claddings.

18. The integrated machine according to claim 1, wherein said vibrator vibrates said vibrating table at the intensity to increase a resistance of embedded color particles to degradation.

19. The integrated machine according to claim 1, wherein said vibrator vibrates said vibrating table at the intensity to increase a visibility factor of embedded color particles.

* * * * *